F. W. MARTIN.
BALL AND SOCKET JOINT.
APPLICATION FILED MAY 12, 1917.
1,268,259.
Patented June 4, 1918.
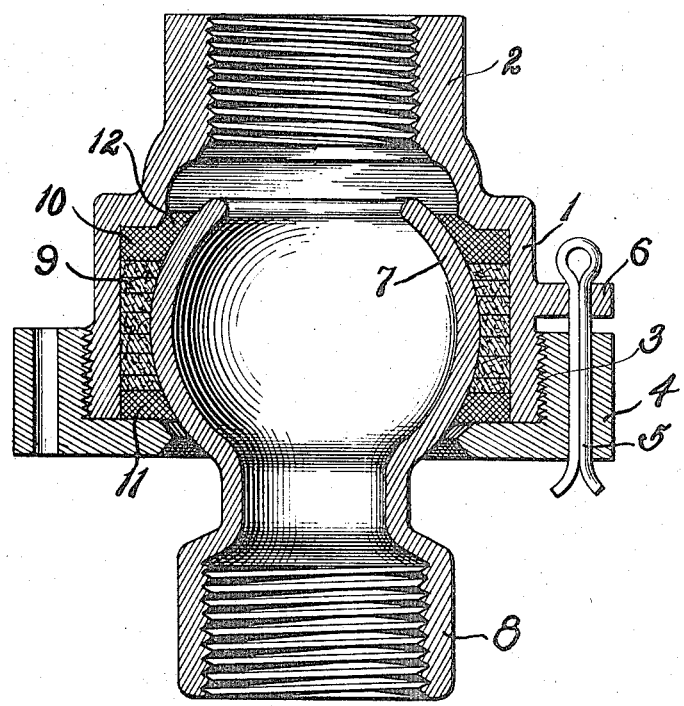
Witness
Harold Strauss
Inventor
Frederick W. Martin
By Synnestvedt Bradley Lechner & Fowkes
Attorneys

UNITED STATES PATENT OFFICE.

FREDERICK W. MARTIN, OF BAYSIDE, NEW YORK, ASSIGNOR TO FRANKLIN RAILWAY SUPPLY COMPANY, OF NEW YORK, N. Y., A CORPORATION OF DELAWARE.

BALL-AND-SOCKET JOINT.

1,268,259.      Specification of Letters Patent.      Patented June 4, 1918.

Application filed May 12, 1917. Serial No. 168,085.

*To all whom it may concern:*

Be it known that I, FREDERICK W. MARTIN, a citizen of the United States, residing at Bayside, borough of Queens, Long Island, New York, have invented certain new and useful Improvements in Ball-and-Socket Joints, of which the following is a specification.

This invention is primarily designed for use in conjunction with ball and socket joints such as are used in tubular or pipe connections as, for example, where pipe connections are to be made between cars in a railway train or between the locomotive and tender.

The primary objects of my invention are the provision of a ball and socket joint which will provide a free moving connection that will be at the same time little subject to leakage and which can be made at low cost and also repaired with a minimum of expense of both time and material.

Referring to the accompanying drawing, it will be seen that in carrying out my invention I provide first a socket or body portion 1 having a connection for a pipe at 2 and a thread at 3 adapted to receive a cap 4 which, when screwed up to the position shown, can be locked by some suitable means as, for example, by the use of a cotter pin 5 which engages an apertured lug 6.

The ball portion of the joint 7 is provided also with a suitable threaded extension 8 for connection to a pipe member and is embraced in a packing 9 held between a seat ring 10 and a follower ring 11, as shown.

The rings 10 and 11 are preferably made with spherical inner surfaces to form a snug fit about the outer surface of the ball 7 and are made of anti-friction metal such as commonly used for packing gaskets and the like. The seat ring 10 is formed with an annulus or projecting part 12 intended primarily to provide a substantial extension of the bearing surface of said seat ring upon the ball 7, and the ring 10 being pressed into position within the socket or body portion 1 is permanently held and will not become dislodged or fall out when it is desired to renew the packing 9. The formation of the ring 10 of the shape shown also reduces the amount of anti-friction metal required while still providing a large bearing surface for the ball 7 and also facilitates the formation of a spherical inner surface on the ring 10 by a pressing operation, eliminating the need of machine work with respect to the insertion of said ring 10 within the socket.

As a convenient material for the packing 9, I prefer to use asbestos graphite fibrous strand packing which of square or oblong section or other suitable form is to be found at hand in most stocks of railroad or shop supplies, and the provision of the seat ring 10 and the follower ring 11 and the arrangement of parts as shown permits the use of such standard packing material, and the compression of the latter obtained by screwing the cap 4 into place with a proper amount of packing inserted, insures a good fitting joint around the ball 7. The large bearing area of the antifriction ring 10 affords a stable support and abutment for the ball 7 and saves a measure of wear upon the packing 9, and the ring 10 not being subject to corrosion will also serve to maintain a free moving joint as well as one not liable to leakage.

I claim:

1. A ball and socket joint, comprising a body portion forming a pipe connection and an enlarged cylindric socket having an internal annular shoulder with a beveled edge at the inner end of said socket, a ball portion of less diameter than the socket and extended within the latter to a point inwardly beyond said shoulder, a cap movably retaining the ball portion within the socket, rings within the socket and resting against the shoulder and cap, respectively, each ring formed from anti-friction metal, an annular substantially conoidally-shaped flange on the shoulder engaging ring and compressed between the ball portion and beveled edge of said shoulder, and a packing entirely filling the socket between said rings.

2. A ball and socket joint, comprising a body portion forming a cylindric socket having an internal annular shoulder with a beveled edge at the inner end of said socket, a ball portion of less diameter than the socket and extended within the latter to a point inwardly beyond said shoulder, an adjustable cap movably retaining the ball portion within the socket, rings resting against the shoulder and cap, respectively, a packing within the socket and confined between the rings, and an annular substantially conoidally-shaped bearing extension on the shoulder engaging ring to engage with the ball portion a distance inwardly beyond said shoulder and be compressed between the beveled edge of the latter and said ball portion on adjustment of the cap.

In testimony whereof I have hereunto signed my name.

FREDERICK W. MARTIN.